United States Patent [19]

Matsuzaki et al.

[11] Patent Number: 4,737,923

[45] Date of Patent: Apr. 12, 1988

[54] TYPE ARRANGEMENT DATA EDITING APPARATUS

[75] Inventors: Kazuo Matsuzaki; Tsuneki Kobayashi; Masao Miyasaka; Kazuyuki Kubo; Kimio Nakamura, all of Ibaraki, Japan

[73] Assignee: Hitachi Koki Co., Ltd., Tokyo, Japan

[21] Appl. No.: 471,377

[22] Filed: Mar. 2, 1983

[30] Foreign Application Priority Data

Mar. 5, 1982 [JP] Japan ................................. 57-35426

[51] Int. Cl.⁴ ................................................ B41J 1/20
[52] U.S. Cl. ..................................... 364/519; 101/111; 400/146
[58] Field of Search ............... 364/200, 900, 518, 519; 365/230, 193; 101/93.18, 93.09, 93.13, 93.14, 93.12, 111; 400/176, 186, 158, 146, 175, 121, 144.2, 144.3

[56] References Cited

U.S. PATENT DOCUMENTS

| | | | |
|---|---|---|---|
| 4,009,654 | 3/1977 | Harris, Jr. et al. | 364/900 |
| 4,144,560 | 3/1979 | Harris, Jr. et al. | 364/900 |
| 4,361,086 | 11/1982 | Simonotti et al. | 400/158 |
| 4,386,862 | 6/1983 | Kittel et al. | 400/175 |
| 4,425,846 | 1/1984 | Sakmann | 400/175 |
| 4,435,792 | 3/1984 | Bechtolsheim | 365/230 |
| 4,473,006 | 9/1984 | Nakano et al. | 101/93.14 |
| 4,490,058 | 12/1984 | Monma et al. | 400/186 |

Primary Examiner—Thomas M. Heckler
Assistant Examiner—Kevin A. Kriess
Attorney, Agent, or Firm—Sughrue, Mion, Zinn, Macpeak and Seas

[57] ABSTRACT

A type arrangement data editing apparatus in which type arrangement data from a type carrier is automatically edited in accordance with the carrier set carried by the type carrier. A first area of a ROM stores the basic type arrangement data for a plurality of basic character sets. A second area of the ROM stores replacement data which is replaced for specific symbols in the basic character sets, and the start addresses of the type arrangement data for each set. An identifier identifies which character set and which replacement data are carried on the type carrier. A microprocessor stores a program for retrieving the respective type arrangement data and inserting the replacement data therein. The data is sent to a RAM, where it is compared to input data to print a specific print symbol.

5 Claims, 6 Drawing Sheets

FIG. 1A
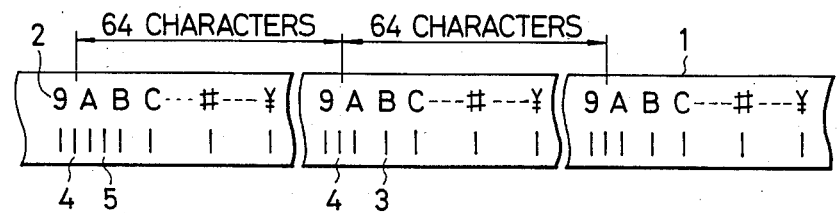
FIG. 1B
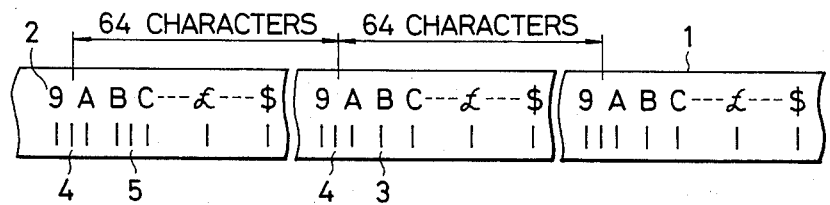
FIG. 3
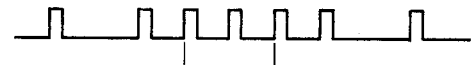
MARK DETECTION SIGNAL CORRESPONDING TO FIG. 1A (LINE 12a)
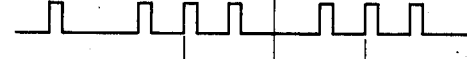
MARK DETECTION SIGNAL CORRESPONDING TO FIG. 1B (LINE 12a)
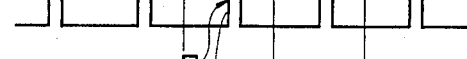
TYPE MARK SIGNAL (LINE 13a)
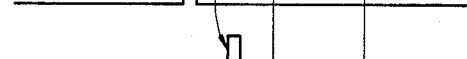
SYNCHRONIZING MARK SIGNAL (LINE 13b)
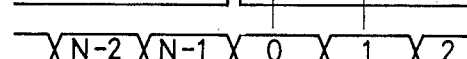
COUNTER RESET SIGNAL (LINE 13c)
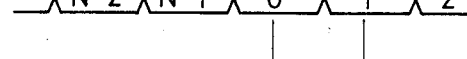
COUNT OF CHARACTER POSITION COUNTER
IDENTIFICATION MARK SIGNAL CORRESPONDING TO FIG. 1A (LINE 13d)
IDENTIFICATION MARK SIGNAL CORRESPONDING TO FIG. 1B (LINE 13d)

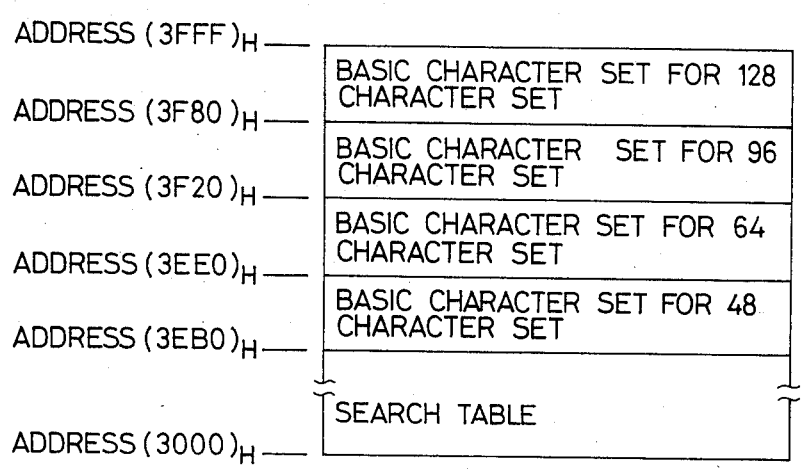

FIG. 4

| ADDRESS (3FFF)H | |
|---|---|
| ADDRESS (3F80)H | BASIC CHARACTER SET FOR 128 CHARACTER SET |
| ADDRESS (3F20)H | BASIC CHARACTER SET FOR 96 CHARACTER SET |
| ADDRESS (3EE0)H | BASIC CHARACTER SET FOR 64 CHARACTER SET |
| ADDRESS (3EB0)H | BASIC CHARACTER SET FOR 48 CHARACTER SET |
| ADDRESS (3000)H | SEARCH TABLE |

FIG. 5

| | | |
|---|---|---|
| | BAND TYPE DATA 4 | : (42)H |
| | END CODE | : (FF)H |
| | REPLACEMENT DATA | : (E0)H |
| | REPLACEMENT ADDRESS | : (25)H |
| | REPLACEMENT DATA | : (D0)H |
| | REPLACEMENT ADDRESS | : (1F)H |
| | BASIC CHARACTER SET HEAD ADDRESS (LOWER BYTE) | : (E0)H |
| | BASIC CHARACTER SET HEAD ADDRESS (UPPER BYTE) | : (3E)H |
| | BAND TYPE DATA 3 | : (41)H |
| | END CODE | : (FF)H |
| | BASIC CHARACTER SET HEAD ADDRESS (LOWER BYTE) | : (E0)H |
| | BASIC CHARACTER SET HEAD ADDRESS (UPPER BYTE) | : (3E)H |
| | BAND TYPE DATA 2 | (40)H |
| | END CODE | : (FF)H |
| ADDRESS (3002)H | BASIC CHARACTER SET HEAD ADDRESS (LOWER BYTE) | (B0)H |
| ADDRESS (3001)H | BASIC CHARACTER SET HEAD ADDRESS (UPPER BYTE) | : (3E)H |
| ADDRESS (3000)H | BAND TYPE DATA 1 | : (00)H |

TYPE ARRANGEMENT DATA EDITING APPARATUS

BACKGROUND OF THE INVENTION

The invention relates to an editing apparatus, such as, for example, in an impact line printer for automatically editing type arrangement data corresponding to the kind of loaded type carrier utilized.

In a conventional line printer, a group of type data codes which are produced by a data source such as CPU are successively compared to type arrangement data determined in accordance with the instantaneous position of a type carrier. When coincidence is detected between the type data code and the instantaneous type carrier position, the symbol in question is printed out. Typical line printers have type carriers such as print bands, print drums, print trains, print chains, etc. By way of example, the following discussion will be made with reference to a type carrier of the print band type.

Since the type arrangement data is determined in accordance with the kind of print band to be used, it is necessary to replace the type arrangement data when the print band is replaced. To this end, plural kinds of type arrangement data corresponding to plural kinds of print bands, respectively, are written into plural ROMs (read only memories). Thus, a particular ROM corresponding to a particular loaded print band may be selectively used to thereby obtain the type arrangement data corresponding to the print band in question. However, since the ROMs correspond to the print bands on a one-to-one basis, if there is a second type of arrangement data which is different from the first type arrangement data stored in the ROM, it is necessary to load another ROM into the line printer which corresponds to this second type arrangement data even if the difference between the first and second type of arrangement datum is relatively minor.

Therefore, as the number of different kinds of print bands having discrete type arrangement data increases, the number of ROMs to be loaded into the line printer correspondingly increases. However, it has been found that there is a limit as to the number of ROMs which can be loaded into the line printer. These limitations are due to both cost and loading space constraints. Specifically, four ROMs have been found to be an optimal number. Thus, in the above-described method in which data in ROMs loaded into a line printer are used as type arrangement data corresponding to the print bands of the line printer, it has been found that the number of different print bands which can be used is limited by the four-ROM optimal capacity of the line printer.

SUMMARY OF THE INVENTION

An object of the present invention is to obviate the above-mentioned drawbacks in prior art printers and to provide an editing apparatus in which the number of different kinds of type carriers which can be used is not constrained.

It is another object of the invention to provide an editing apparatus in which the replacement of type arrangement data may be easily performed while maintaining low manufacturing costs and small loading space.

According to the present invention, with reference to the fact that the bulk of the various type arrangement data corresponding to various type carriers are equivalent (so long as their character set sizes are the same, the basic type arrangement data are set per every character set size (hereinafter referred to as the basic character set) and information necessary for obtaining the basic character set and the inherent data for each type carrier are preliminarily stored in a non-volatile memory such as a ROM. The preliminarily stored data are then selectively read out from the non-volatile memory on the basis of the information for identifying the kind of loaded type carrier, and the read-out data are written into an accessible memory such as a RAM (random access memory) to thereby automatically edit the type arrangement corresponding to the loaded print band.

BRIEF DESCRIPTION OF THE DRAWINGS

The present invention will be described with reference to a detailed description of a preferred embodiment thereof. In the following description, reference will be made to the accompanying drawings, in which:

FIGS. 1A and 1B are front views each showing an example of a print band used in the apparatus according to the present invention;

FIG. 3 is a time chart showing the relation of the mark signals obtained from the print band;

FIG. 4 is a memory map showing the relation between the data and the addresses of ROM 42 used in the apparatus according to the present invention;

FIG. 5 is a memory map showing the detail of the search table in the memory map shown in FIG. 4;

DETAILED DESCRIPTION OF THE PREFERRED EMBODIMENTS

Figure 2:
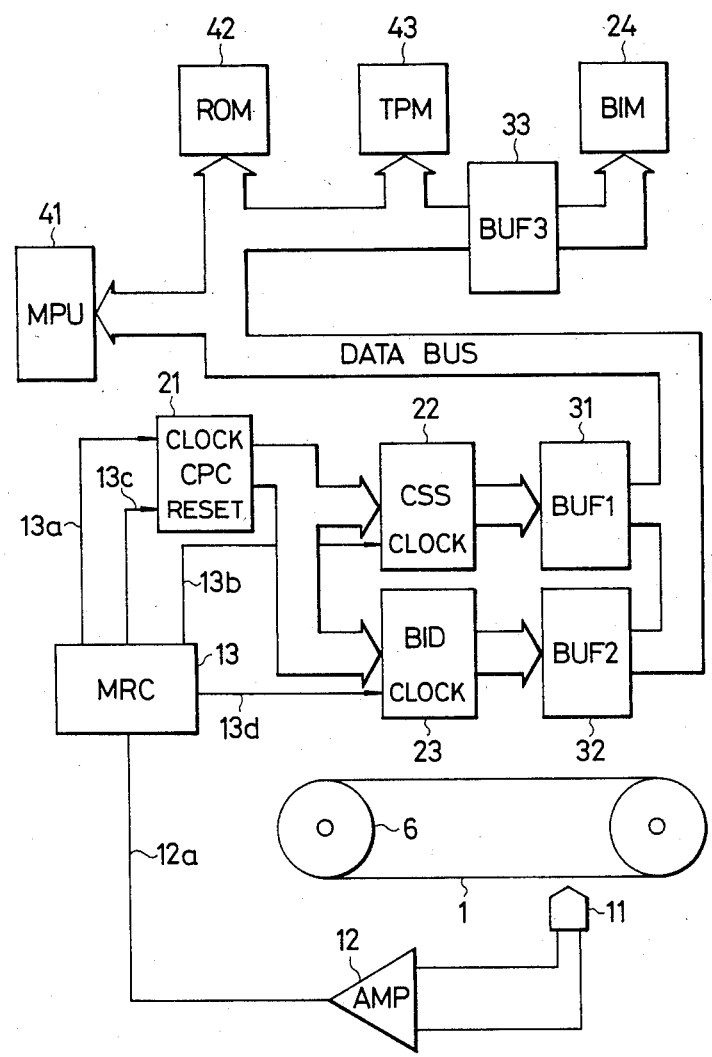
FIG. 2 is a block diagram illustrating and embodiment of the apparatus according to the present invention.

FIGS. 1A and 1B show examples of print bands used in a preferred embodiment of the invention. As to the character set size of the print band, 48, 64, 96 and 128 character sets are generally used, the following description will be made (for illustrative purposes only, and not by way of limitation) with reference to a print band of a 64 character set.

A print band 1 is provided with type symbols 2 and type marks 3 corresponding to the type symbols 2, a synchronizing mark 4 disposed between two adjacent type marks 3 for indicating the head of every type block, and an identification mark 5 disposed between two other adjacent type marks 3 for indicating the kind of the print band 1. Parts of characters used in the print band 1 as shown in FIGS. 1A and 1B are different from each other. Specifically, the sharp symbol "p" and yen symbol "¥" of FIG. 1A are replaced by the pound symbol "£" and dollar symbol "$" in FIG. 1B, respectively. Assume now that when the type symbols 2 differ, the type codes corresponding to the type symbols also differ, while at the same time, there is a case where the corresponding type codes are not changed even if the type symbols are changed. For example, the type code corresponding to the sharp symbol "#" is assumed to be $(7B)_H$. The type code $(7B)_H$ is hexadecimal digits of an 8 bits binary type code (01111011). This also applies to the type codes corresponding to the symbols "¥", "₱" and "$" which are assumed to be $(5B)_H$, $(DO)_H$ and $(EO)_H$, respectively. Further, assume that the type codes corresponding to the type symbols other than the above-mentioned symbols are the same between the respective print bands 1 in FIGS. 1A and 1B. The print bands 1 in FIGS. 1A and 1B are different from each other in the respective positions of the identification mark 5. In the case where the corresponding type codes are not changed between the two bands, even if the type symbols vary therebetween, the respective identification marks 5 will be disposed at the same positions. The function of the identification mark 5 will be further described below.

FIG. 2 is a block diagram of an embodiment of the apparatus according to the present invention. The type marks 3, the above-mentioned synchronizing marks 4 and the identification mark 5 provided on the print band 1 which is rotated by a driving pulley 6 are detected by a detector 11. Signals representing the result of the detection are transferred to a discrimination/control section 13 through a waveform shaping circuit 12. The discrimination/control section 13 produces type mark signals, synchronizing mark signals and an identification mark signal corresponding to the type mark 3, the synchronizing marks 4 and the identification mark 5, respectively. These output signals are applied to a character position counter 21 and latch circuits 22 and 23 such that data representing the kind of print band 1 are set in the latch circuits 22 and 23. These data are transferred through buffers 31 and 32 to a microprocessor 41 (hereinafter abbreviated as MPU) which constitutes a typical microcomputer system having internal ROMs, RAMs, I/O ports, etc. which are not shown. The MPU 41 selectively reads out data, based on the input data thereto identifying the print band 1, from a ROM 42 in which are stored data groups necessary for obtaining type arrangement data. Thus, the resulting type arrangement data corresponding to the print band 1 are edited in a temporary memory 43. The edited type arrangement data are transferred to a band image memory 24 through a buffer 33.

The discrimination/control section 13 functions to discriminate the signals on input line 12a to separate them into the above-mentioned type mark signals, synchronizing mark signals and identification mark signal. This discrimination process is described in detail in Japanese Patent Application Laid-Open (Kokai) No. 54-076324 (corresponding to U.S. application Ser. No. 964,111 filed by Nakano et al. and assigned to the same assignee) now, U.S. Pat. No. 4,473,006 and incorporated by reference to the present application. The description of the method of discrimination and separation will therefore be omitted in this specification. The discrimination/control section 13 outputs the type mark signals, the synchronizing mark signals and the identification mark signal onto lines 13a, 13b and 13d, respectively. The control section 13 further produces a counter reset signal onto a line 13c in synchronism with the type mark signal only after the synchronizing mark signal has been detected.

FIG. 3 is a time chart showing the relationship between the signals on lines 13a-13d and 12a. The counter 21 counts up in response to the type mark signals on the line 13a and is reset by a reset signal on line 13c. That is, if the number of the character set size of the print band 1 is assumed to be N, the count of the counter 21 is incremented from zero to (N−1) every time the type mark signal is generated. Since the number of the character set size of the print band 1 in FIG. 1 is 64, N is 64 and the counter 21 counts up from zero to 63. The output of the counter 21 is sent to the latch circuits 22 and 23. In that in response to the synchronizing mark signals on the line 13b and the identification mark signal on the line 13d, (N−1) data (in this embodiment, 63 data) to be used for identifying the character set size of the print band 1 are set in the latch circuit 22 and data ("0" for FIG. 1A and "1" for FIG. 1B) to be used for identifying the respective print bands 1 of the same character set size are set in the latch circuit 23. Reading out the data set in the latch circuit 22 through the buffer 31, the MPU 41 determines the character set size to be a 48 character set, a 64 character set, a 96 character set or a 128 character set when the read-out data indicates 47, 63, 95 or 127, respectively. Further, reading out the data set in the latch circuit 23 through the buffer 32, the MPU 41 identifies the respective print band 1 and provides one byte (8 bits) of data for indicating the result of identification of the print band 1. The most two significant bits of the 8 bit data represent the result of identification of the character set size and the other six bits of the 8 bit data represent the data read out through the buffer 32. The most two significant bits are determined such that $2^7=0$ and $2^6=0$ for a 48 character set, $2^7=0$ and $2^6=1$ for a 64 character set, $2^7=1$ and $2^6=0$ for a 96 character set and $2^7=1$ and $2^6=1$ for a 128 character set, with all the other bits being made "0". Upon the completion of this operation, the 8 bits data is OR'd with the data read out through the buffer 32, with the most two significant bits thereof being made "0". By this operation, one byte of data for every print band 1 is obtained. The thus obtained data is hereinafter referred to as the "band type data". The band type data is $(40)_H$ for the print band 1 of FIG. 1A and $(41)_H$ for the print band 1 of FIG. 1B. On the basis of this band type data, the editing of the type arrangement data corresponding to every print band 1 is performed. This editing operation will be described hereunder.

FIG. 4 is a memory map showing the relation between the addresses of the ROM 42 and the data. The ROM 42 is allotted with addresses from $(3000)_H$ to $(3FFF)_H$. The basic character sets are written in the addresses $(3EBO)_H$ through $(3EDF)_H$ of ROM 42 for a 48 character set, in the addresses $(3EEO)_H$ through $(3F1F)_H$ for a 64 character set, in the addresses $(3F20)_H$ through $(3F7F)_H$ for a 96 character set, and in the addresses $(3F80)_H$ through $(3FFF)_H$ for a 128 character set. Thus, in the addresses $(3000)_H$ et seq., a series of data necessary for editing type arrangement data corresponding to every print band 1 are recorded. This memory region will be referred to hereunder as a "search table".

Figure 6:
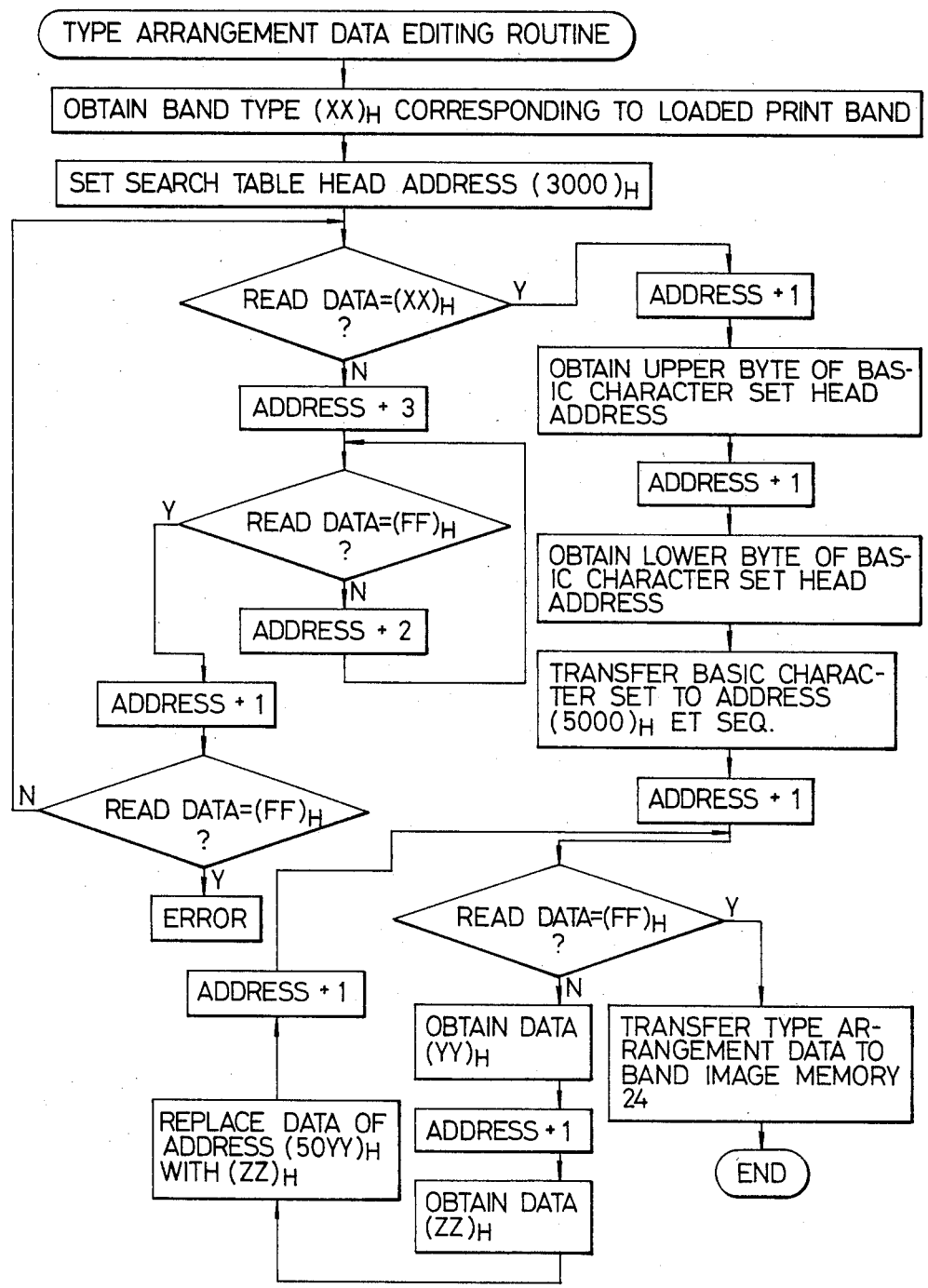
FIG. 6 is a flow chart showing an example of processing for type arrangement edition.

FIG. 5 is a memory map showing the detail of the search table, and FIG. 6 is a flow chart of the process of editing type arrangement data. In FIG. 6, the steps "ADDRESS+1", "ADDRESS+2" and "ADDRESS+3" are indicative of the renewal (or incrementing) of the address of the search table. In the search table, as shown in FIG. 5, the above-mentioned band type data, an upper and a lower byte for indicating the head address of the memory in which the basic character set corresponding to that band type data is stored, data to be replaced when there is data different from the basic character set (hereinafter referred to as the "replacement data"), an address indicating the position into which the replacement data is to be written (hereinafter referred to as the replacement address), and an end code (FF)$_H$ indicating an end of the stored information relating to a kind of the print band 1, have been written in sequence. All the data, from the final address of the search table before the basic character set area, are stored as (FF)$_H$. Having obtained the band type data (hereinafter assumed to be (XX)$_H$) corresponding to the type band 1 loaded on a printer through the process as mentioned above, the MPU 41 (reads out and) searches table the band type data coincident with the obtained band type data from the search table in the following manner.

First, the data in the head address (3000)$_H$ of the search table is read out to judge whether the data coincides with (XX)$_H$. If there is no coincidence therebetween, the address of the search table is renewed by three (ADDRESS +3), the data in the renewed address is read, and a judgement is made as to whether the read out data is (FF)$_H$ or not. If this data is (FF)$_H$ another band type data has been written into the next address, and therefore the address of the search table is renewed by one (ADDRESS +1). If the data in the thus renewed address is not (XX)$_H$, the above-mentioned processing is repeated. In the case where the above-mentioned data is not (FF)$_H$, this indicates that the data stored therein are the replacement address and the replacement data. In this case, the address of the search table is renewed by two (ADDRESS +2) and the data in the thusly renewed address is judged again as to whether it is (FF)$_H$ or not. If the data is not (FF)$_H$, the last step is repeated, while if it is, the search table is renewed by one (ADDRESS +1) and the abovementioned processing is repeated. In these procedures, if (FF)$_H$ is successively read out during the previous two process steps, it means that the end of the search table has been reached without detecting band type data coincident with (XX)$_H$, which is considered as being indicative of an error. Further, as will be apparent from the description to follow, since the number of character set can be as large as 128, the largest replacement address can only be (7F)$_H$, and therefore the replacement address cannot be mistaken for the end code during the above-mentioned processing.

Having obtained band type data coincident with (XX)$_H$ through the above-mentioned processing, the process branches off and the address of the search table is renewed by one (ADDRESS +1) to obtain the upper byte of the head address of the basic character set corresponding to that print band 1. The address of the search table is further renewed by one (ADDRESS +1) to obtain the lower byte of the same. On the basis of the thus obtained head address of the basic character set in the ROM 42, the data of the same byte number as the number of the character set size of that print band 1 is transferred to the temporary memory 43. In this embodiment, the head address of the temporary memory 43 is (5000)$_H$. Thereafter, the address of the search table is further renewed by one (ADDRESS +1) and the data is judged as to whether it is (FF)$_H$ or not. If the data is not (FF)$_H$, the data is judged to be the replacement address (hereinafter assumed to be (YY)$_H$). Then, the address of the search table is further renewed by one (ADDRESS +1) to read the replacement data (ZZ)$_H$ and the thus obtained replacement data (ZZ)$_H$ is written in the address (50YY)$_H$ as obtained by the calculation ((5000)$_H$ +(YY)$_H$). Thereafter, the address of the search table is renewed again by one (ADDRESS +1) and the data is judged as to whether it is (FF)$_H$ or not. If the data is not (FF)$_H$, the above-mentioned processing is repeated, while if it is (FF)$_H$, there is no data to be replaced and the totality of type arrangement data corresponding to the loaded print band 1 has been obtained in the temporary memory 43. The thus-edited type arrangement data in the temporary memory 43 is transferred to the accesible band image memory 24 to complete the editing of the type arrangement data. The type arrangement data may be transferred to the band image memory 24 either by transferring one type block at one time, or by repeatedly transferring the same data by plural type blocks.

Figure 7A:
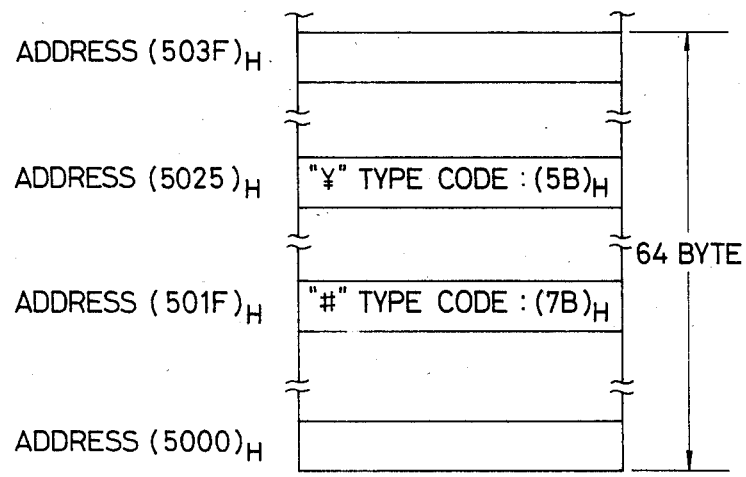
FIGS. 7A and 7B are diagrams showing type arrangement data formed in the temporary memory corresponding to the respective print bands shown in FIGS. 1A and 1B.

The above-mentioned processing will now be explained with reference to the print band 1 in the examples shown in FIGS. 1A and 1B. First, note that the band type data of the print band 1 in FIG. 1A is (40)$_H$, and that the head address (3EE0)$_H$ of the basic character set is obtained from the search table. Thus, the data of 64 bytes in the addresses from (3EE0)$_H$ to (3F1F)$_H$ is transferred into the addresses (5000)$_H$ to (503F)$_H$ of the temporary memory 43. In the case of band type data (40)$_H$, there is no replacement data and the type arrangement data is the same as the basic character set. The data stored in the addresses from (5000)$_H$ to (503F)$_H$ is subsequently transferred to the band image memory 24 through the buffer 33 to complete the editing of the type arrangement data. FIG. 7A shows the type arrangement data formed in the temporary memory 43 in the case of this band type data (40)$_H$.

Figure 7B:
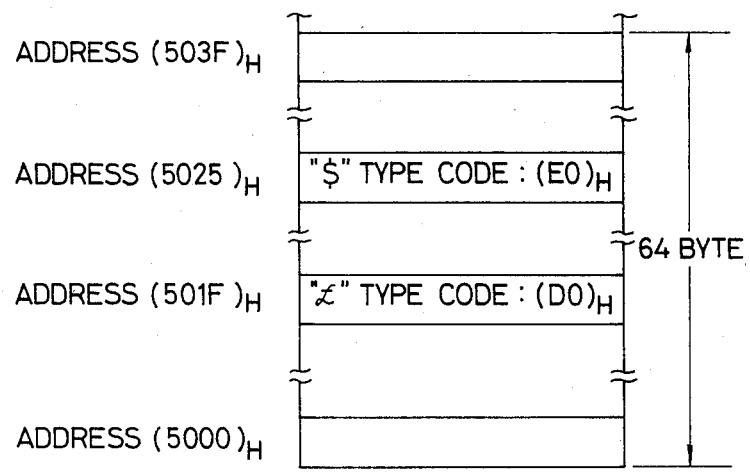

In the case of the print band 1 in FIG. 1B, the band type data is (41)$_H$ the head address of the basic character set is (3EE0)$_H$ similarly to the above-mentioned case. Thus, in the same manner as described above, 64 byte data is transferred to the temporary memory 43. At this time, the data in the temporary memory 43 is the same as that shown in FIG. 7A. However, since the band type data is (41)$_H$, there are two replacement data. Specifically, the data (7B)$_H$ in the address (501F)$_H$ is replaced by (DO)$_H$, and the data (5B)$_H$ in the address (5025)$_H$ is replaced by (EO)$_H$. As a result, the data in the temporary memory 43 is stored as shown in FIG. 7B. The transfer of data from memory 43 to the band image memory 24 is performed in the same manner as in the above-mentioned case.

The addresses of the band image memory 24, into which the type arrangement data has been written through the above-mentioned processing, are controlled by a wellknown print control circuit (not shown) to generate type arrangement data which is determined in accordance with the instantaneous position of the print band 1 and which is necessary in order to perform the print operation.

Further, the temporary memory 43 of FIG. 2 is not always required. That is, the editing of the type arrangement data may be directly performed in the band image memory 24. Also, it is not necessary to restrict the basic character set to only one kind per each character set size. For example, in the case where a specific print band 1 exists in which the quantity of the replacement data is larger than ½ of the number of the character set size, it is advantageous (in view of the savings in memory capacity) to provide a data configuration such that another basic character set is stored in the ROM 42 for the specific print band 1 without any replacement data. Further, according to the present invention, it is not necessary to restrict the number of the character set size to the abovementioned four kinds. It is possible to edit type arrangement data in the same manner as in the above-mentioned case even in the case where the other character set sizes are used, so long as the character set sizes and the data of the type character to be loaded are preliminarily known.

According to the present invention, the type arrangement data corresponding to a loaded type carrier can be edited on the basis of a basic character set provided per every character set, or on the basis of the basic character set and the replacement data different from the basic character set, so that type arrangement data corresponding to the number of different kinds of type carriers can be obtained in a system which has a small memory capacity.

For example, it has been confirmed that less than 23 bytes of data is sufficient for one kind of type carrier on the average where the respective type arrangement data were edited corresponding to the type carriers of 34 kinds in total, including 2 kinds of 48 character set type carriers, 15 kinds of 64 character set type carriers, 15 kinds of 96 character set type carriers, and 2 kinds of 128 character set type carriers. The average byte number of data required for one kind of type carrier can be further reduced if the type arrangement data editing operation is made corresponding to the many kinds of type carriers. That is, according to the present invention, the greater the number of different type carriers, the greater the memory saving advantages of the invention become.

As described above, according to the present invention, respective type arrangement data can be obtained corresponding to type carriers, even if the number of different kinds of type carriers is large, without sharply increasing the memory capacity. Thus, it is possible to use many kinds of type carriers merely by replacing the type carrier.

What is claimed is:

1. A data editing apparatus in which a group of type data code transferred from data source are successively compared to edited type arrangement data obtained by determining the instantaneous position of a movable carrier, to print a given print symbol of a character set carried on said carrier when coincidence between said group of type data codes and said edited type arrangement data is detected, said apparatus comprising:
   identifying means (11) for identifying the kind of character set on said carrier,
   first accessible memory means (24) for obtaining said edited type arrangement data from a control means (41),
   second static memory means (42) containing data of at least one basic character set per every kind of discrete character set stored in a basic character set storage region and inherent data for each type carrier stored in a search data storage region, and
   said control means (41) coupled to said identifying means and receiving an output indictive of the kind of said character set from said second static memory means (42), said control means (41) writing basic type arrangement data common to a plurality of said discrete character sets, selectively reading out data from said basic character set region into said first accessible memory means and writing said inherent data into a predetermined address in said first accessible memory means, whereby said type arrangement data is automatically edited corresponding to the characters on said carrier.

2. A data editing apparatus according to claim 1, wherein said search data region stores first data indicating kinds of type on said carriers and second data indicating the start address of letter/character sets of respective kinds of characters stored in said basic character set region.

3. A data editing apparatus according to claim 2, wherein said search data storage region stores said inherent data indicating replacement data to selectively replace said basic type arrangement data, and data indicating the address on which a data of said basic type arrangement data of said characters sets is to be replaced by said replacemeent data.

4. A data editing apparatus according to claim 1, wherein said identifying means identifies a character set on said carrier and type arrangement data thereof.

5. A type data editing apparatus in which a group of type data codes transferred from a data source are successively compared to type arrangement data obtained by determining the instantaneous position of a movable carrier, to print a given print symbol of a character set carried on said carrier when coincidence is determined therebetween, said apparatus comprising:
   means for detecting identification and synchronization marks (11) on said carrier and producing an output of the identification and synchronization mark signals for a character set on said carrier;
   means for discriminating between said identification and synchronization mark signals;
   microprocessor means (41) for receiving said identification mark signals coming from said means for discriminating and said synchronization mark signals a recognizing the relational positions of said marks to identify the kind of character set on said carrier and producing a plurality of read-out signals;
   a first memory means (42) storing type arrangement data in a first region thereof and storing a plurality of replacement data in a second region thereof for selectively replacing data on said first region, said first memory means receiving said read-out signals from said microprocessor means, said read-out signals forming address inputs to said first and second regions of said first memory means; and
   second memory means storing data (42) read out from said first memory means to form said edited type arrangement data as a function combined type arrangement data as modified by said replacement data.

* * * * *